US006886893B1

(12) United States Patent
Fisch et al.

(10) Patent No.: US 6,886,893 B1
(45) Date of Patent: May 3, 2005

(54) WHEEL WITH INTERLOCKING HUB AND SPACER

(75) Inventors: Robert J. Fisch, Elkhorn, WI (US); Randal P. Wiser, Delevan, WI (US); Amy R. Seibel, Mequon, WI (US)

(73) Assignee: Poly-Flex, Inc., Walworth, WI (US)

( * ) Notice: Subject to any disclaimer, the term of this patent is extended or adjusted under 35 U.S.C. 154(b) by 24 days.

(21) Appl. No.: 10/236,844

(22) Filed: Sep. 6, 2002

(51) Int. Cl.$^7$ ............................................... B60B 5/02
(52) U.S. Cl. ................................. 301/111.01; 301/121
(58) Field of Search ....................... 301/111.01, 111.03, 301/111.04, 111.07, 112, 118, 120, 121, 122

(56) References Cited

U.S. PATENT DOCUMENTS

| | | | | |
|---|---|---|---|---|
| 597,757 A | * | 1/1898 | Bassford | 301/121 |
| 935,061 A | * | 9/1909 | Roulstone | 301/111.03 |
| 938,804 A | * | 11/1909 | West | 301/111.03 |
| 4,828,480 A | * | 5/1989 | Smith | 425/562 |
| 5,277,480 A | * | 1/1994 | Chiu | 301/111.07 |
| 5,368,371 A | | 11/1994 | Markling | 301/64.701 |
| 5,603,555 A | * | 2/1997 | Dickey et al. | 301/111.05 |
| 5,884,982 A | * | 3/1999 | Yemini | 301/111.03 |
| 6,170,920 B1 | * | 1/2001 | Markling | 301/111.01 |
| 6,375,274 B1 | * | 4/2002 | Morris | 301/111.01 |
| 6,402,258 B1 | * | 6/2002 | Martinez | 301/111.04 |
| 6,561,593 B2 | * | 5/2003 | Godwin | 301/111.04 |

OTHER PUBLICATIONS

Photograph of singularly molded wheel–and–spacer, taken on or about Jun. 7, 2002, date of manufacture unknown.
Photograph of singularly molded hub–and–spacer combination requiring pin, taken on or about Jun. 7, 2002 (believed produced by Partners In Plastic), date of manufacture unknown.

* cited by examiner

Primary Examiner—Russell D. Stormer
(74) Attorney, Agent, or Firm—DL Tschida

(57) ABSTRACT

An apparatus for allowing pre-assembly of a wheel and wheel spacer and a method of using the apparatus are disclosed. The apparatus provides a structure within the hub of a molded plastic wheel and a structure on a spacer segment for engagement of the two parts. A variety of embodiments are described in which the spacer can easily be snapped, screwed, or pressed into the wheel. This allows pre-assembly of the spacer and wheel so that when needed, a spacer need not be found or acquired, but is readily available to the user.

30 Claims, 8 Drawing Sheets

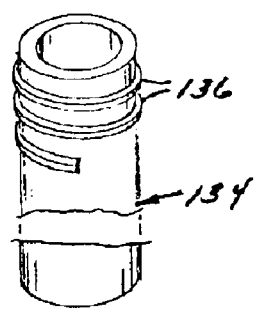 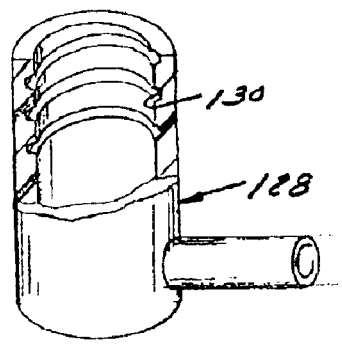 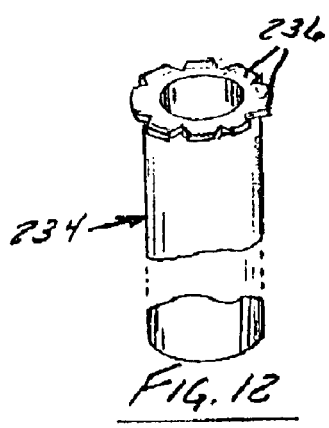 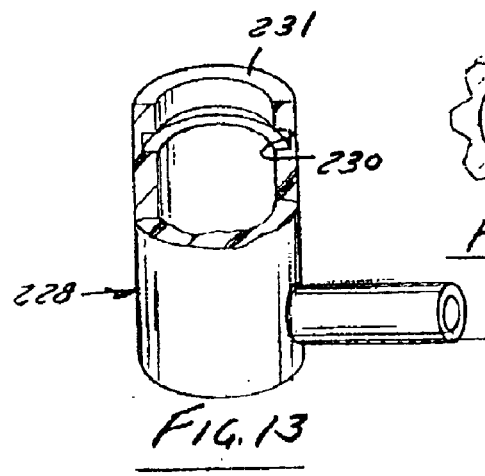 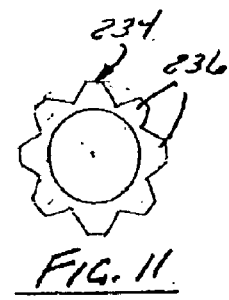 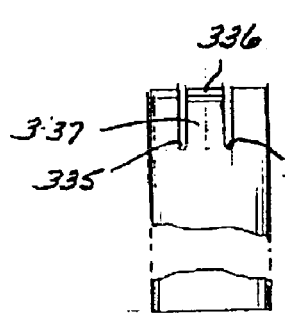 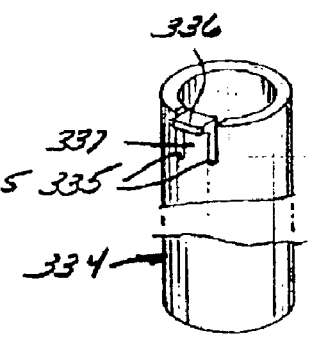 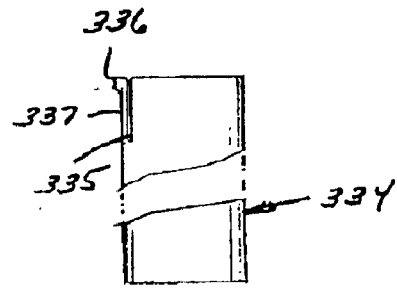 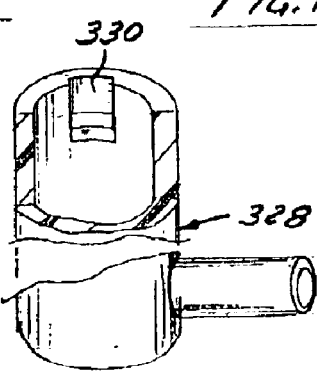

WHEEL WITH INTERLOCKING HUB AND SPACER

BACKGROUND OF THE INVENTION

1. Field of the Invention

The present invention relates in general to the field of plastic wheels. More particularly, the present invention relates to an improved apparatus and method for shipping, assembling, and attaching molded plastic wheels to devices such as garbage carts, barbeque grills, outdoor fire pits, etc. Specifically, a preferred embodiment of the present invention provides a wheel and spacer assembly in which the wheel and spacer can be shipped as separate parts but can readily be attached to one another after shipment.

2. Discussion of the Related Art

In providing plastic wheels for connection with wheeled items such as garbage carts, it is usually also necessary to provide a spacer in the form of a washer or cylindrical sleeve between the wheel and the item to prevent contact between the two. Without a spacer, the wheel and the body of the item rub against one another, thus impeding smooth rolling of the assembled item.

Past practice in this field of invention has included blow molding plastic wheels with an attached or integral spacer. The spacer portion protruded from the hub to provide the necessary space between the wheel itself and the apparatus to which it was connected. However, the integral spacer was recognized as problematic because with a protrusion on one side, the wheels were not readily stackable and could not be packaged compactly. This posed a problem for efficient shipping and handling of the wheels.

In order to solve the problem and reduce shipping costs associated with wheels having integral spacers, wheel manufacturers began manufacturing spacers separately from the wheel. The resulting wheels had sides with two relatively unbroken planar surfaces and were therefore more readily stackable and shippable. The spacer segments could be shipped in the same package, but were separate from the wheels. This solution increased efficiency in shipping and storage, but led to the problem of spacer loss. When workers assembled garbage carts or other apparatus on location, spacers would invariably be missing, either due to miscounting or misplacement, so that wheels could not be properly attached to the intended apparatus on site.

What is needed, therefore, is a wheel having the manufacturing and shipping advantages of unattached spacers but also providing a spacer that is definitely available when wheels are to be attached to axles.

SUMMARY AND OBJECTS OF THE INVENTION

By way of summary, the present invention is directed to a molded plastic wheel which is readily engageable with a spacer and a method of using the same. A primary object of the invention is to provide an apparatus that is easily shippable but also reduces spacer loss. Another object in the invention is to provide an apparatus that is easy to assemble and inexpensive to manufacture. Yet another object of the invention is to provide a method for manufacturing, shipping, and assembling an apparatus that reduces lost pieces and therefore reduces lost man hours.

In accordance with the first aspect of the invention, these objects are achieved by providing an apparatus comprising a wheel having an engagement portion within its hub and a spacer having a corresponding engagement portion on its surface. In one embodiment, the hub bears a groove and the spacer bears a corresponding ridge. In another embodiment, the wheel bears a recess and the spacer bears a corresponding tab or tabs. In yet another embodiment, the spacer is threaded for engagement with threads of the hub.

In accordance with a second aspect of the invention, these objects are achieved by manufacturing a wheel separate from a spacer, wherein the wheel and spacer are able to snap together, screw together, or may be bonded or pressed into engagement with one another.

In accordance with yet another aspect of the invention, these objects are achieved by providing wheels having generally flat surfaces on both sides for compact shipping, yet also providing the ability to attach spacers, at least on a temporary basis, so that workers assembling wheels to garbage carts or other apparatus in the intended assembly location have a spacer for each wheel.

These and other aspects and objects of the present invention will be better appreciated and understood when considered in conjunction with the following description and the accompanying drawings.

BRIEF DESCRIPTION OF THE DRAWINGS

The advantages and features of the present invention will become more readily apparent by referring to the exemplary, and therefore non-limiting, embodiments illustrated in the accompanying drawings, wherein like reference numerals designate the same elements in the several views, and in which:

FIG. 9 is a perspective view of a third embodiment wherein the spacer is threaded;

FIG. 10 is a cutaway perspective view of a third embodiment wherein the hub is threaded;

FIG. 11 is a top view of a fourth embodiment of the spacer;

FIG. 12 is an end perspective view of the spacer shown in FIG. 11;

FIG. 13 is a side cutaway view of a fourth embodiment of the hub;

FIG. 14 is a side view of a fifth embodiment of the spacer;

FIG. 15 is a perspective view of the spacer shown in FIG. 14;

FIG. 16 is another side view of the spacer shown in FIG. 14;

FIG. 17 is a cutaway view of a fifth embodiment of the hub;

Figure 1:
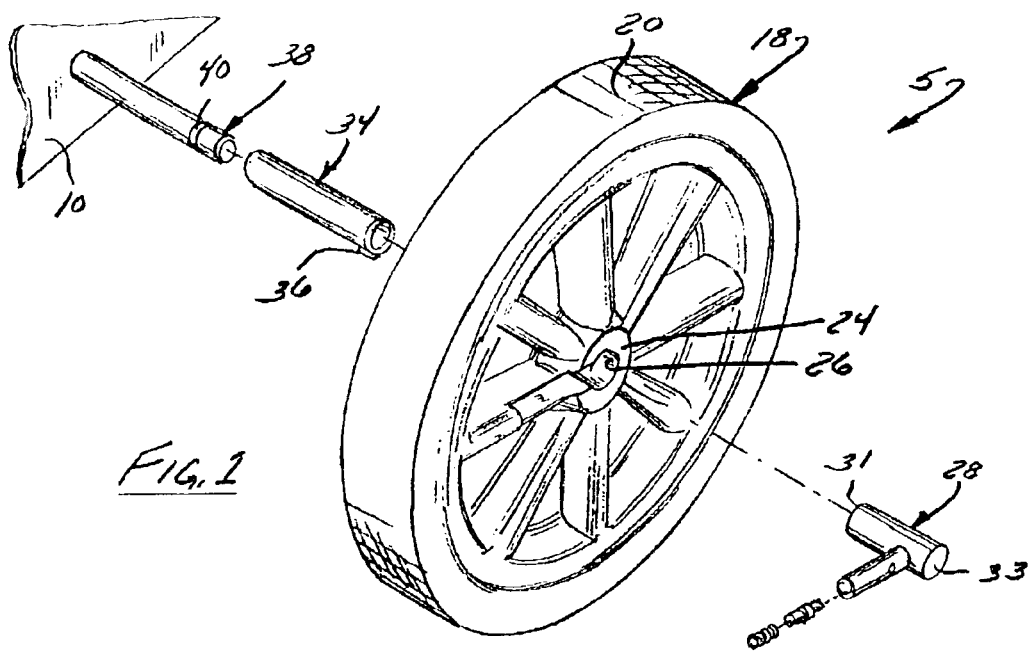
FIG. 1 is a perspective view of the various parts of a first embodiment of the apparatus of the present invention.

In describing the various embodiments of the invention illustrated in the drawings, it should be understood that the use of specific terminology is not meant to limit the scope of the invention. Rather, the use of specific terms includes all equivalents recognized by those skilled in the art.

DESCRIPTION OF PREFERRED EMBODIMENTS

A. Apparatus

Referring to FIG. 1, it can be seen that the present invention consists of a system 5 that provides mobility to an apparatus 10. The system includes a wheel 18 that rolls on an outside rim or rolling surface 20, a face 23, and an inner rim 24 having a bore 26. The bore 26 may be fitted with an axle retaining segment or hub piece 28. In a preferred embodiment of the invention, the hub piece 28 also serves as an axle support member. However, hub piece 28 need not be provided. In such cases, the inner rim 24 may itself form the axle support member, see, e.g. FIG. 8. One preferred wheel, axle, and hub piece assembly is described in U.S. Pat. No. 6,170,920 B1 and hereby incorporated herein by reference. Other axle retaining members (not shown) may include pins, keys, caps, etc.

Figure 2:
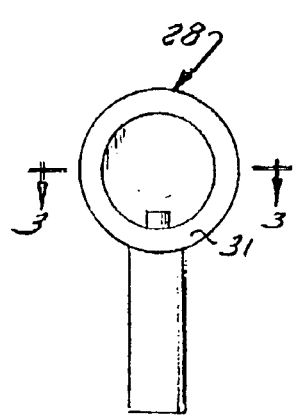
FIG. 2 is a top plan view of the optional hub piece shown in FIG. 1.
Figure 3:
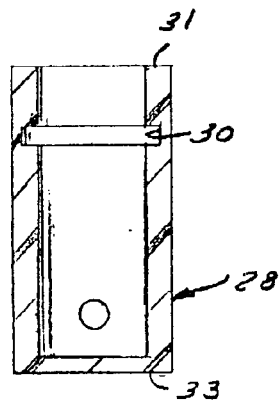
FIG. 3 is a side cutaway view taken along line 3—3 of FIG. 2.
Figure 4:
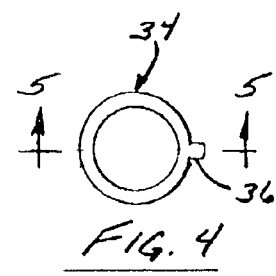
FIG. 4 is a top plan view of the spacer shown in FIG. 1.
Figure 5:
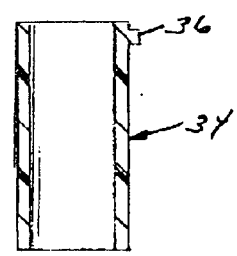
FIG. 5 is a side cutaway view taken along line 5—5 of FIG. 4.
Figure 6:
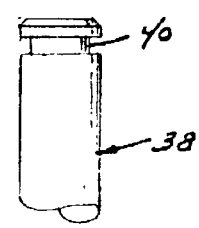
FIG. 6 is a side view of the axle shown in FIG. 1.

Hub piece 28 is further illustrated in FIGS. 2 and 3. As can be seen from those drawings, hub piece 28 bears a first engagement portion, such as spacer recess 30, generally located near the open end 31 of hub piece 28 and an axle retainer or protrusion 32 at the closed end 33. Referring also to FIGS. 4–6, the spacer recess 30 is shaped to retain spacer 34, e.g., a washer or cylindrical sleeve, by way of a second engagement portion, such as spacer protrusion 36, and the axle retainer 32 is shaped to retain the axle 38 via axle recess 40. The protrusion 36 may be made of a flexible material such as a rubberized plastic.

Figure 7:
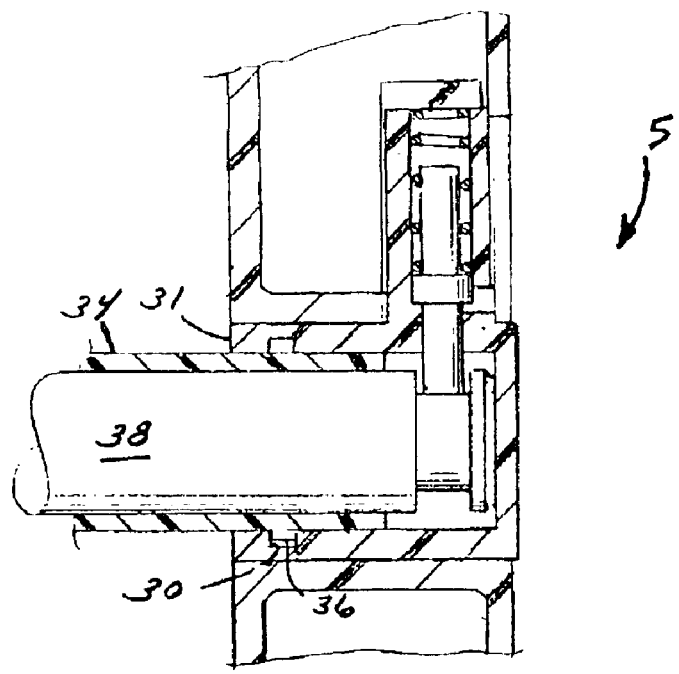
FIG. 7 is a side cutaway view of the hub-spacer-wheel-axle assembly shown in FIG. 1 in an assembled position.
Figure 8:
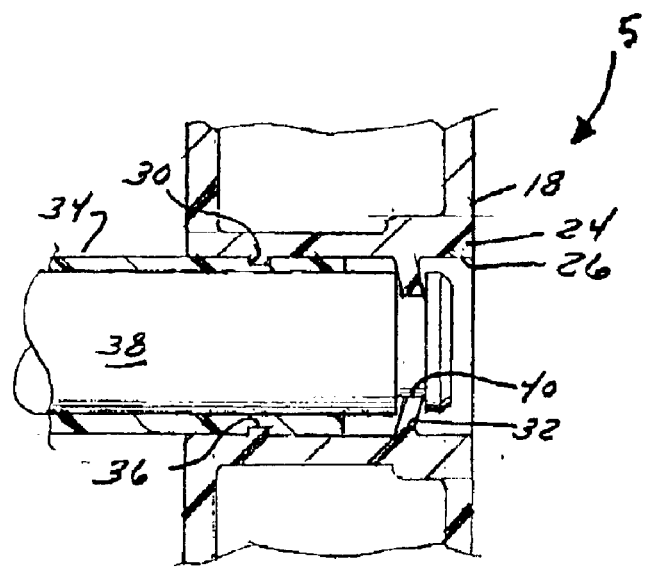
FIG. 8 is a side cutaway view of a second embodiment wherein the hub consists of the wheel bore.

FIGS. 7 and 8 show the various pieces of the system 5 as assembled. FIG. 7 shows an embodiment in which hub piece 28 has a first engagement portion, in this case spacer recess 30 (here an annular groove) and axle retaining tabs 32. Spacer recess or groove 30 retains spacer 34 by way of a second engagement portion, protrusion 36 while tabs 32 retain axle 38 using recesses 40. FIG. 8 shows a similar view of an alternate embodiment that does not employ hub piece 28, as also shown in U.S. Pat. No. 5,368,371 which is now incorporated herein by reference. In addition, FIG. 8 shows the interchangeability of the first and second engagement portions. In this embodiment, tabs 32 are shown molded directly within bore 26 to form the axle support and retaining member. Tabs 32 again retain axle 38 using recesses 40. The groove 30 is now located on spacer 34 while protrusions 36 are located within the bore 26 of inner rim 24.

It should be noted that when used, hub piece 28 need not necessarily be closed on one end. The term "open end" 31 simply refers to the end most closely associated with spacer 34 and "closed end" 33 refers to the end most distal from spacer 34. As will be described below, various other embodiments of the invention are also contemplated. Corresponding parts in the different embodiments are incremented by 100 for the sake of clarity.

Referring to FIGS. 9 and 10, spacer 134 is provided with a second engagement portion that is an external thread 136 for screw engagement with the axle support member 128. The support member 128 is provided with a first engagement portion that is a corresponding internal thread 130. It is contemplated that spacer 134 will have a smaller external diameter than the interior diameter of support member 128 so that providing external threads 136 on the spacer 134 is the most efficient screwing solution.

FIGS. 11–13 illustrate another embodiment of the present invention in which the second engagement portion consists of flexible tabs 236 in an eight-pointed star-like configuration located at an end of spacer 234. The support member or hub piece 228 is provided with an annular groove 230 toward open end 231 to retain tabs 236. Alternatively, a single tab or tabs in a different configuration could be provided.

Referring now to FIGS. 14–17, another embodiment contemplates the second engagement portion including interstitial spaces 335 within spacer 334. The provision of at least two spaces 335 provides spacer 334 the flexibility to be more easily inserted into support member 328. The tab 337 created by spaces 335 bears a lip or ridge 336 for engagement within a corresponding first engagement structure in support member 328. As shown in FIG. 17, the corresponding structure could be a single groove 330. However, it should be noted at this point that the different embodiments illustrated and described may be used interchangeably where desired. For example, the spacer 334 shown in FIGS. 14–16 may be equally beneficially used in conjunction with the support member 228 shown in FIG. 13. In that case, lip 336 would be engaged within annular groove 230 with the same overall effect of retaining a spacer 34 within a support member 28.

Figure 18:
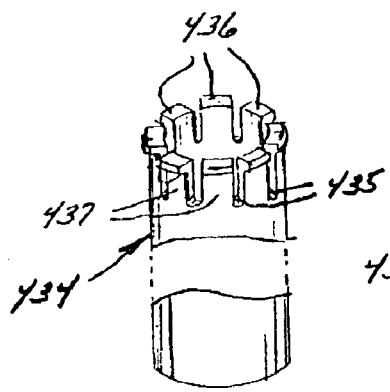
FIG. 18 is a perspective view of a sixth embodiment of the spacer.
Figure 20:
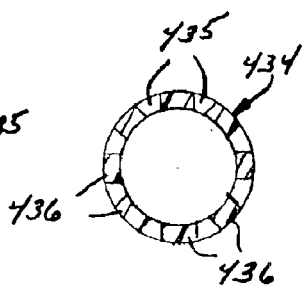
FIG. 20 is an end view of the spacer taken along line 20—20 of FIG. 19.
Figure 19:
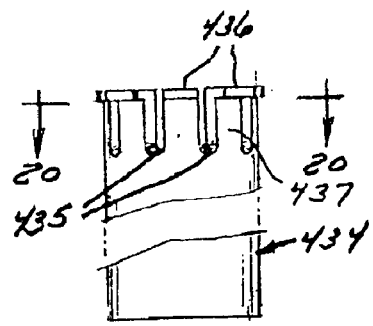
FIG. 19 is a side view of the spacer shown in FIG. 18.

FIGS. 18–20 show still another embodiment in which the spacer 434 has an engagement structure including a plurality of spaces 435 and thus a plurality of tabs 437 bearing retainable lips 436.

Figure 21:
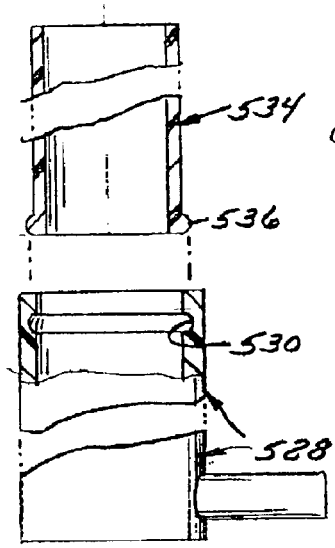
FIG. 21 is a cutaway view of a seventh embodiment of the hub and spacer.

In another preferred embodiment, FIG. 21 shows a support member 528 having an annular groove 530 similar to that shown in FIG. 13. However, in FIG. 21, spacer 534 bears an annular ring 536 that fits within annular groove 530 for connection of the two parts. Annular ring 536 could be a rubber or plastic O-ring added to an end of spacer 534 either during or after manufacture of spacer 534.

Figure 22:
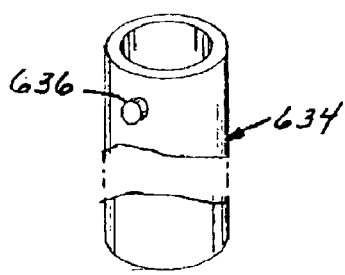
FIG. 22 is a perspective view of an eighth embodiment of the spacer.
Figure 23:
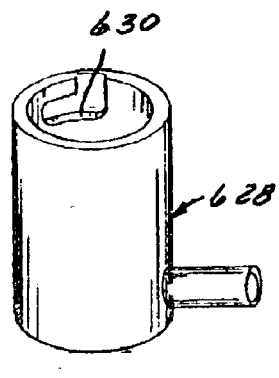
FIG. 23 is a cutaway view of an eighth embodiment of the hub.

FIGS. 22 and 23 illustrate yet another embodiment in which the spacer 634 bears a knob 636. The support member 628 preferably contains an L-shaped groove or channel 630. Knob 636 is slipped into channel 630 and spacer 634 is then turned to "lock" spacer 634 into place. Note that it is equally possible to place a knob or protrusion on the interior of the hub and place a channel in or on the spacer segment of the assembly. Thus, first and second engagement portions are interchangeable. This is also true of other embodiments discussed above.

Figure 25:
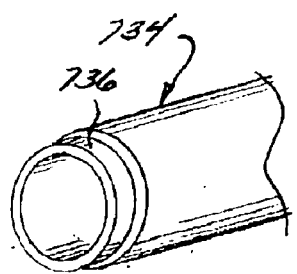
FIG. 25 is a perspective view of the spacer shown in FIG. 24.
Figure 24:
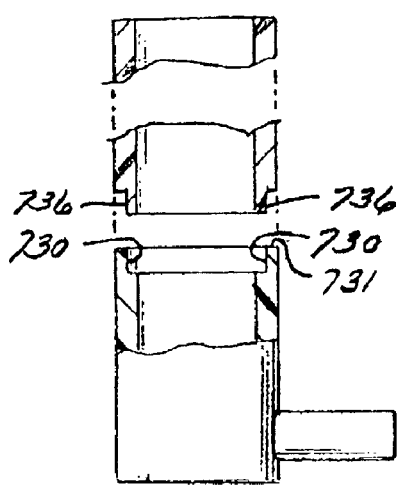
FIG. 24 is a cutaway view of a ninth embodiment of the hub and spacer of the present invention.

Finally, in still another embodiment, FIG. 24 illustrates a stepped design in which support member 728 is connected to spacer 734 by way of a press fit. Support member 728 bears a recess 730 at its open end 731 into which protrusion 736 slides. Protrusion 736 may consist of a full ring as shown in FIG. 25 to be inserted into the corresponding recess or groove 730 shown most clearly in FIG. 26. Protrusion 736 need not be an integrally molded full ring, however, it may instead consist of a series of tabs similar to those shown in FIG. 18 and described above. Alternative constructions also include post-molding addition of protrusion 736 and post-molding cutting to create protrusion 736. The same is true for the construction of recess 730, as long a spacer 734 can be connected to support member 728 by press fit.

In one preferred embodiment, wheel 18 is molded from a high-density polyethylene material and is approximately 12 inches in diameter. Hub piece 28 is injection molded of the same material and has an exterior diameter of approximately 1⅝ inches. The interior diameter of hub piece 28 is approximately 1⅜ inches. Spacer 34 is a hollow cylindrical sleeve approximately 1½ inches long, preferably formed from by extruding the same polyethylene material through a die. Unless spacer 34 is designed to fit over an extended portion of axle retaining member 28, which is a possible variation but one not likely to be as cost-effective as the present preferred embodiment, the external diameter of spacer 34 is preferably less than the internal diameter of the axle retaining member 28, or less than 1⅜ inches. In another embodiment, the spacer may be one or more plastic or metal washers. Moreover, because the engagement portions are largely meant to hold spacer 34 within retaining member 28 somewhat temporarily, the dimensions of these features are varied and may be primarily driven by cost and ease of manufacture.

Figure 26:
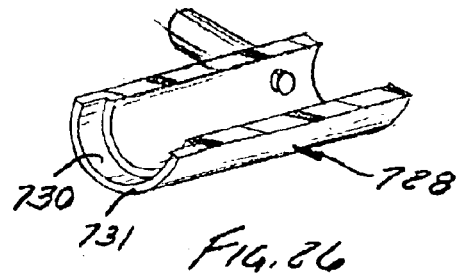
FIG. 26 is a cutaway perspective view of the hub shown in FIG. 24.

The first and second engagement portions such as those shown in FIGS. 24–26 may also be joined by an adhesive, tape, or sonic welding. This may be with or without any additional locking structure, i.e. a protrusion, lip, recess, thread, etc. For example, a glue may be used to more permanently join a flat top side of the spacer with a flat side of the hub face. While this could take place during the manufacturing process before shipping, in order to maximize space in the shipping containers, it is preferred that such adhesion takes place in the prior to transport to the field. Once joined in this manner, the spacer and the wheel will not easily be separated.

B. In Use and Operation

A method for use of the foregoing apparatus includes both the manufacture of wheels and the manufacture of spacers. A preferred method of wheel manufacture is blow-molding because blow-molding is a relatively inexpensive method of producing plastic parts. The preferred cylindrical spacers are preferably currently manufactured by simple extrusion and post-molding addition or creation of the claimed engagement structures, but if called for could also be manufactured by blow molding, injection molding, or another appropriate technique. The advantage to extrusion is its extreme simplicity and associated reduction in manufacturing cost.

Figure 27:
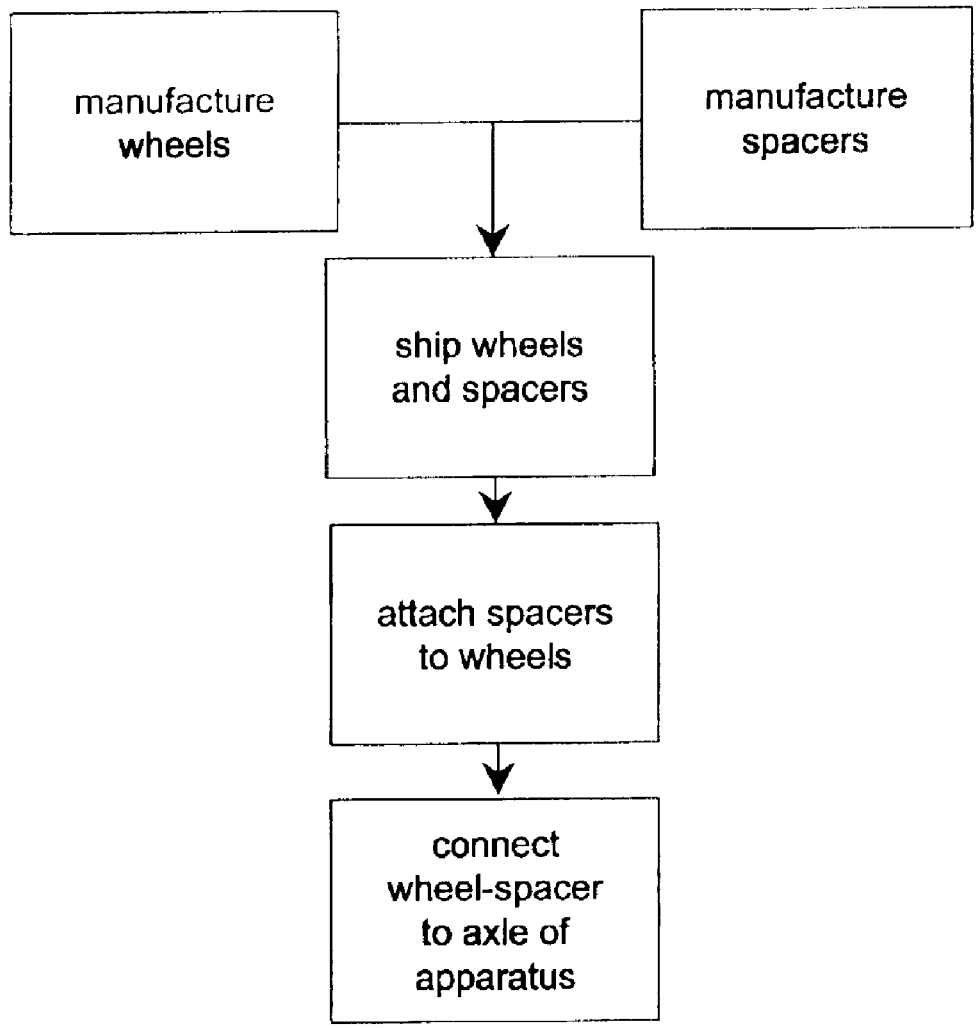
FIG. 27 is a flowchart of a preferred method of the present invention.
Figure 28:
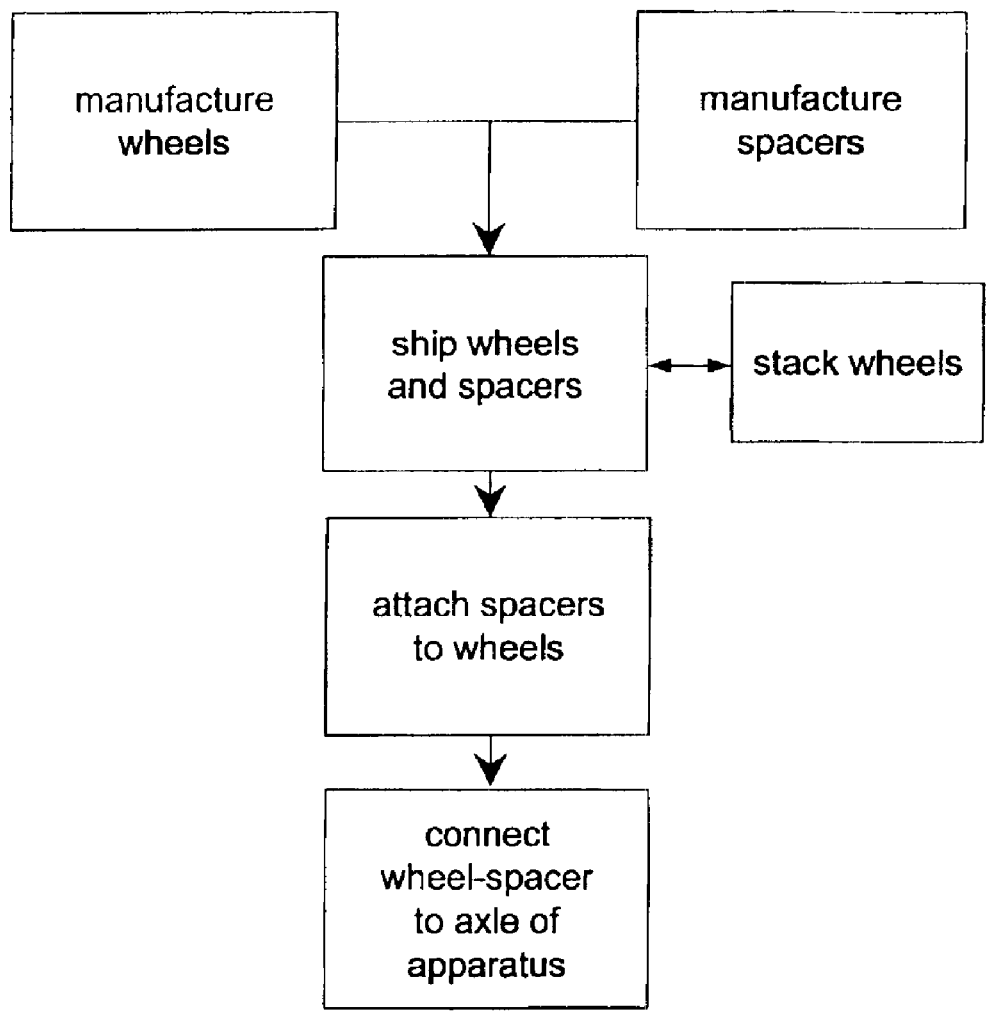
FIG. 28 is also a flowchart of a method of the invention.

As best shown in FIGS. 27 and 28, after manufacturing, the wheels, which have been provided with two relatively flat planar surfaces, or faces, are stacked on top of or next to one another in boxes for shipment. A corresponding number of spacers are shipped with each quantity of wheels. The wheels and associated spacers are then shipped to a purchaser.

At present, the purchaser of the wheels typically takes a desired number of wheels and a corresponding number of spacers, along with an axle and the object to be rolled, such as a garbage cart, to the intended assembly location, i.e., out in the "field" on location at a garbage pick-up site. To maximize space in a vehicle and assemble objects only on an as needed basis, the objects are stacked inside one another and an appropriate number of wheels, spacers, and axles are placed within the topmost object. These unassembled parts are then transported into the field and assembled as needed.

For example, a garbage removal service provider may wish to carry extra garbage carts with him or her on a particular route, anticipating that some new garbage carts will be needed. Existing garbage carts may be found in a condition that is too worn for continued use, extra garbage carts may be needed for particular institutions or households, or new clients may request garbage removal service and require a new cart or carts. The worker on the route can then provide the carts as needed using the unassembled parts he or she has brought with him or her.

As mentioned previously, the foregoing known method of providing wheels for an object suffers from the problem of spacer loss. Wheels and axles are relatively large and "important" and are not easily forgotten, miscounted, or misplaced. However, spacers are small and may appear to be insignificant. They are therefore often forgotten, miscounted, or lost in transit. As a result, the worker in the field may be unable to assemble an object such as a garbage cart when needed, or may assemble it incorrectly, without a spacer, thus providing an object with substandard performance capacity and a shortened life expectancy.

Figure 29:
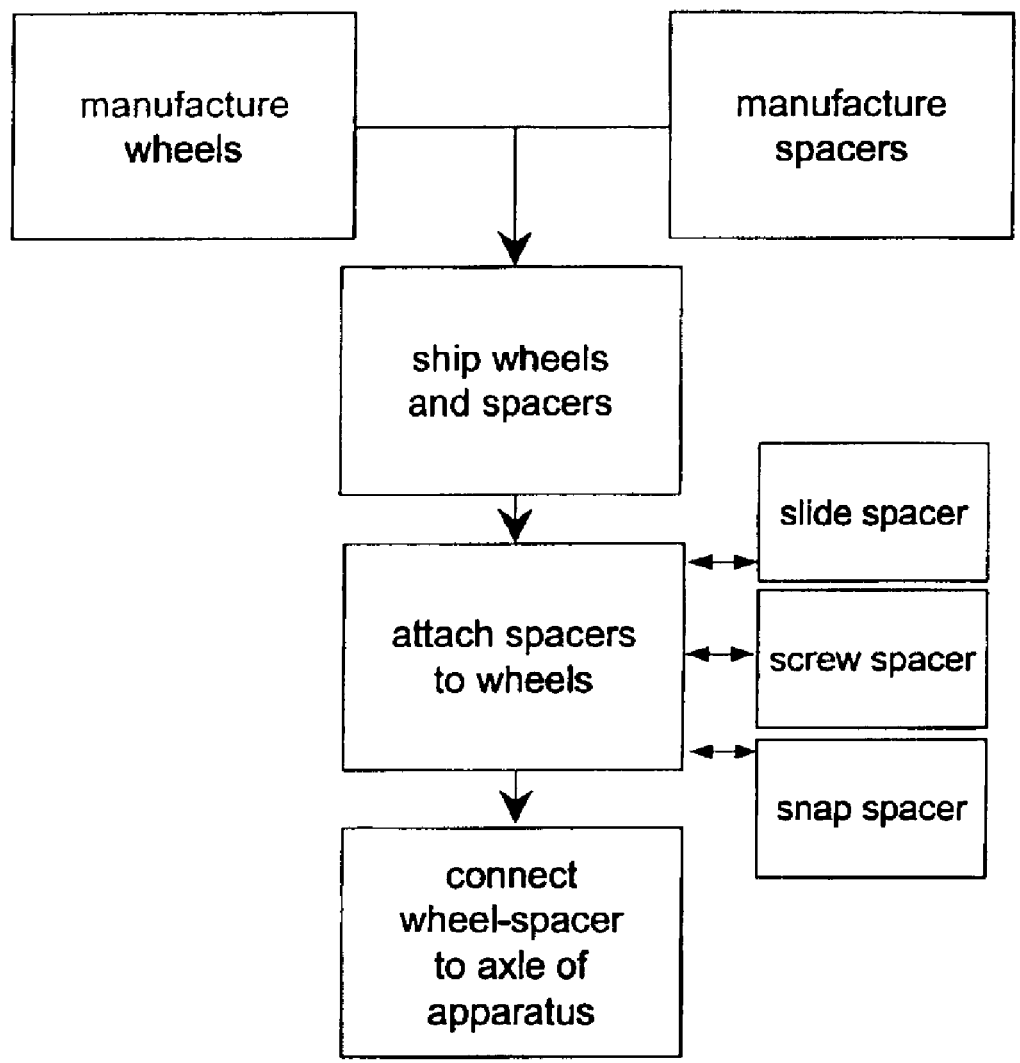
FIG. 29 is another flowchart illustrating various methods of the invention.
Figure 30:
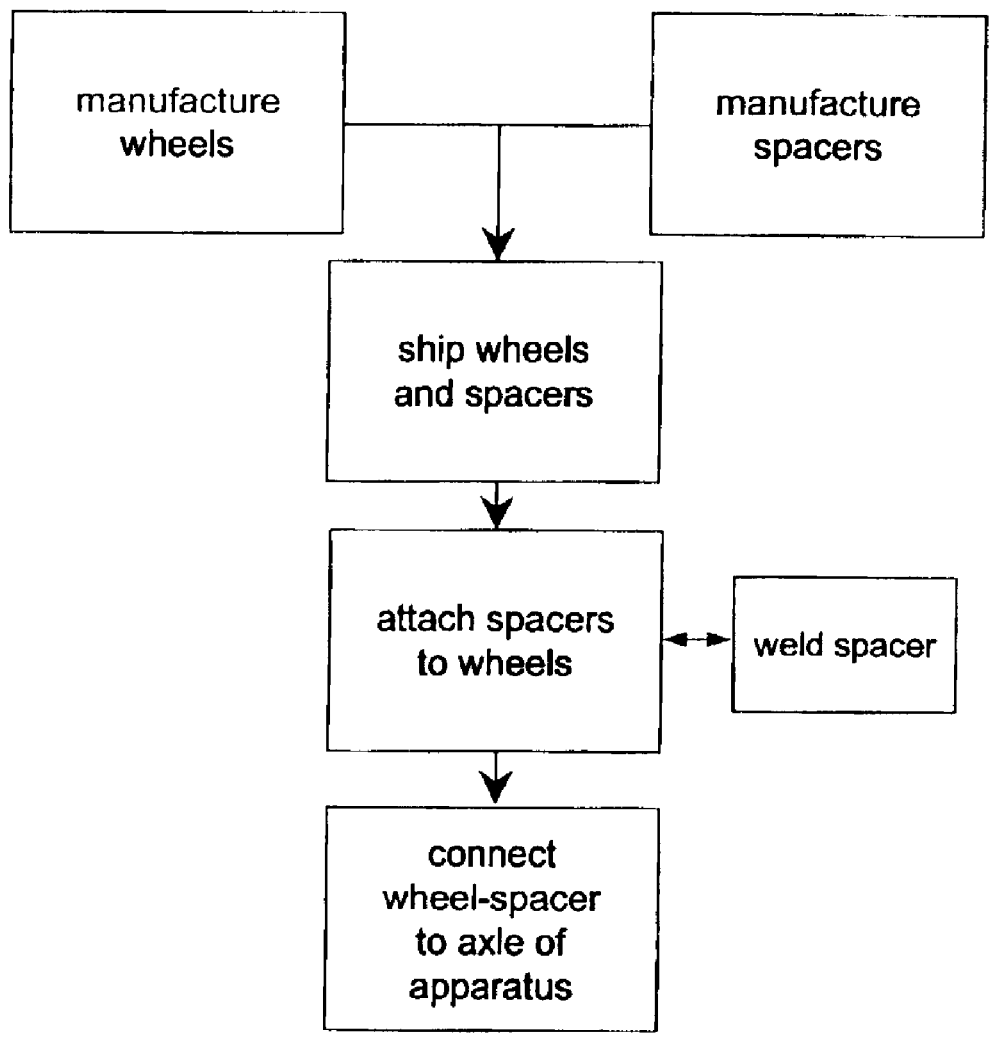
FIG. 30 is a flowchart illustrating another method of the invention.

As best shown in FIG. 29, the method of the present invention solves this problem by allowing wheel purchasers to pre-assemble the wheel and spacer after it has been shipped to them. Spacers are simply attached (e.g. by snapping, screwing, or sliding) to the wheels at the storage location (e.g., a warehouse) prior to being taken into the field so that when a worker attempts to assemble the wheeled object, he or she will have all the parts that he or she needs and will be able to assemble the object quickly and properly. The worker simply connects the pre-assembled wheel and spacer to an axle of the object or apparatus. In one embodiment, as shown in FIG. 30, the spacer is welded into place.

The advantages of the present invention are multiple: (1) this method allows for ease in manufacturing by the production of a spacer separate from a wheel, (2) it allows for more efficient shipping and storage of stacked and/or side-by-side wheels by the provision of two relatively flat planar surfaces, and (3) it reduces the waste of lost components and waste of workers' time by providing a pre-assembly step and ensuring that spacers are available to workers when needed.

Although the best mode contemplated by the inventors of carrying out the present invention is disclosed above, practice of the invention is not limited thereto. It will be manifest that various additions, modifications, and rearrangements of the features of the present invention may be made without deviating from the spirit and scope of the underlying inventive concept.

For example, a variety of other known materials can be used equally effectively, and other sizes or shapes may be dictated by the particular use of the wheel 18. Moreover, any suitable engagement method would suffice. For example, the present invention could utilize a rubberized annular ring, a single rubberized bump, or a plurality of bumps or protrusions in any workable shape or material as protrusions and any suitable groove, indentation, or recess, by itself or in series, could be employed to retain the spacer protrusions. Alternatively, if desired, the spacer could be made of a metal, as could the wheel hub, for added durability and strength.

Furthermore, all the disclosed features of each disclosed embodiment can be combined with, or substituted for, the disclosed features of every other disclosed embodiment except where such features are mutually exclusive. This means that any particular spacer configuration described herein could be used in conjunction with any appropriate hub configuration herein. Similarly, while the above embodiments detail the use of a recess within the support member and a protrusion on a spacer, the locations of those parts may be reversed, as was noted in regard to FIGS. 21 and 22. It is intended that the appended claims cover all such additions, modifications, and rearrangements.

What is claimed is:

1. A plastic wheel comprising:
 a rolling surface;
 an axle support member operably associated with the rolling surface, wherein the axle support member has a central bore;
 an axle retaining segment within the support member, the retaining segment including a first engagement portion; and
 a spacer having a second engagement portion for engagement with the first engagement portion of the retaining segment.

2. The wheel of claim 1, wherein the first engagement portion is a recess and the second engagement portion is a protrusion.

3. The wheel of claim 2, wherein the protrusion forms an external thread and the recess forms a corresponding internal thread.

4. The wheel of claim 2, wherein the recess is an annular groove.

5. The wheel of claim 4, wherein the recess is at least one channel.

6. The wheel of claim 2, wherein the recess is at least one channel.

7. The wheel of claim 2, wherein the recess is at least one axial groove.

8. The wheel of claim 2, wherein the protrusion is at least one flexible tab.

9. The wheel of claim 2, wherein the protrusion is an annular lip.

10. The wheel of claim 2, wherein the protrusion is at least one knob.

11. The wheel of claim 2, wherein the protrusion is at least one ridge.

12. The wheel of claim 2, wherein the spacer contains at least one interstitial space.

13. The wheel of claim 2, wherein the first engagement portion is a protrusion and the second engagement portion is a recess.

14. The wheel of claim 2, wherein the protrusion forms an external thread and the recess forms a corresponding internal thread.

15. The wheel of claim 13, wherein the recess is an annular groove.

16. The wheel of claim 13, wherein the annular groove abuts an end of the spacer.

17. The wheel of claim 13, wherein the recess is at least one channel.

18. The wheel of claim 13, wherein the recess is at least one axial groove.

19. The wheel of claim 13, wherein the protrusion is at least one flexible tab.

20. The wheel of claim 13, wherein the protrusion is an annular lip.

21. The wheel of claim 13, wherein the protrusion is at least one knob.

22. The wheel of claim 13, wherein the protrusion is at least one ridge.

23. The wheel of claim 13, wherein the spacer contains at least one interstitial space.

24. The wheel of claim 1, wherein the axle retaining segment is integrally formed with the bore of the axle support member.

25. The wheel of claim 1, wherein the axle retaining segment is formed separately from the axle support member.

26. The wheel of claim 1, wherein the spacer is a cylindrical sleeve having an external diameter smaller than the internal diameter of the axle retaining segment.

27. A system for providing mobility to an apparatus comprising:
 a wheel having an outer rolling surface and an inner axle receiving portion;
 an axle inserted into the receiving portion of the wheel; and
 a cylindrical sleeve carried on the axle between the wheel and the apparatus, wherein the sleeve is engageable with the wheel by manually screwing it into place.

28. The system of claim 27, wherein the sleeve has an external thread.

29. The system of claim 27, wherein the wheel has a receiving groove.

30. The system of claim 27, wherein the sleeve has a protrusion to engage the wheel.

* * * * *